US012767474B2

(12) United States Patent
Nagao et al.

(10) Patent No.: US 12,767,474 B2
(45) Date of Patent: Oct. 20, 2026

(54) DEVICE AND METHOD FOR PROCESSING BASE PAPER ROLL AND DEVICE FOR MANUFACTURING CORRUGATED CARDBOARD SHEET

(71) Applicant: MITSUBISHI HEAVY INDUSTRIES MACHINERY SYSTEMS, LTD., Hyogo (JP)

(72) Inventors: Takahiro Nagao, Hyogo (JP); Hideki Mizutani, Hyogo (JP); Tsunehiro Kawashima, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 142 days.

(21) Appl. No.: 18/294,882

(22) PCT Filed: Sep. 25, 2023

(86) PCT No.: PCT/JP2023/034637
§ 371 (c)(1),
(2) Date: Feb. 2, 2024

(87) PCT Pub. No.: WO2024/122163
PCT Pub. Date: Jun. 13, 2024

(65) Prior Publication Data

US 2025/0122043 A1 Apr. 17, 2025

(30) Foreign Application Priority Data

Dec. 9, 2022 (JP) ................................ 2022-197397

(51) Int. Cl.
*B65H 19/28* (2006.01)
*B31F 1/20* (2006.01)
(Continued)

(52) U.S. Cl.
CPC ............... *B65H 19/28* (2013.01); *B31F 1/20* (2013.01); *B32B 29/005* (2013.01); *B32B 29/08* (2013.01);
(Continued)

(58) Field of Classification Search
None
See application file for complete search history.

(56) References Cited

U.S. PATENT DOCUMENTS

2010/0163154 A1* 7/2010 Masuda ................ B31F 1/2831 156/64

FOREIGN PATENT DOCUMENTS

JP 2971264 B2 11/1999
JP 2009137729 A 6/2009
(Continued)

OTHER PUBLICATIONS

International Search Report for International Application No. PCT/JP2023/0034637 mailed Nov. 14, 2023; 5pp.

*Primary Examiner* — Michael N Orlando
*Assistant Examiner* — Abhishek A Patwardhan
(74) *Attorney, Agent, or Firm* — HAUPTMAN HAM, LLP

(57) ABSTRACT

A device and a method for processing a base paper roll and a method for manufacturing a corrugated cardboard sheet include a winding device that winds corrugated cardboard base paper drawn out by rotating a base paper roll, a paper leading edge detection unit that detects a leading edge of the corrugated cardboard base paper wound by the winding device, a taping device that fixes the leading edge of the wound corrugated cardboard base paper to an outer peripheral face of the base paper roll with adhesive tape, and a control unit that controls a rotation speed of the base paper roll based on an arrival direction of the leading edge of the
(Continued)

corrugated cardboard base paper with respect to the taping device on the outer peripheral face of the base paper roll when the paper leading edge detection unit detects the leading edge of the corrugated cardboard base paper, and activates the taping device after controlling the rotation speed of the base paper roll.

6 Claims, 9 Drawing Sheets

(51) Int. Cl.

| | |
|---|---|
| ***B32B 29/00*** | (2006.01) |
| ***B32B 29/08*** | (2006.01) |
| ***B32B 37/00*** | (2006.01) |
| ***B32B 37/20*** | (2006.01) |
| ***B32B 38/18*** | (2006.01) |
| ***B65H 26/08*** | (2006.01) |

(52) U.S. Cl.
CPC .......... *B32B 37/0053* (2013.01); *B32B 37/20* (2013.01); *B32B 38/1841* (2013.01); *B65H 26/08* (2013.01); *B32B 2317/127* (2013.01); *B65H 2301/4631* (2013.01); *B65H 2513/11* (2013.01); *B65H 2553/412* (2013.01); *B65H 2601/20* (2013.01); *B65H 2701/1311* (2013.01)

(56) References Cited

FOREIGN PATENT DOCUMENTS

| | | |
|---|---|---|
| JP | 2010142988 A | 7/2010 |
| WO | 2019107475 A1 | 6/2019 |

* cited by examiner

DEVICE AND METHOD FOR PROCESSING BASE PAPER ROLL AND DEVICE FOR MANUFACTURING CORRUGATED CARDBOARD SHEET

RELATED APPLICATIONS

The present application is a National Phase of International Application Number PCT/JP2023/034637 filed Sep. 25, 2023, and claims priority of Japanese Application Number 2022-197397 filed Dec. 9, 2022.

FIELD

The present disclosure relates to a device and a method for processing a base paper roll in which corrugated cardboard base paper is wound and a device for manufacturing a corrugated cardboard sheet including the device for processing a base paper roll.

BACKGROUND

A corrugating machine as a device for manufacturing a corrugated cardboard sheet includes a single facer and a double facer. The single facer corrugates a medium and laminates a top liner thereon to form a single-faced web. The double facer laminates a bottom liner on the single-faced web to form a single-wall corrugated cardboard sheet. The single-wall corrugated cardboard sheet manufactured by the double facer to be continuous is cut to a certain width by a slitter scorer and cut to a certain length by a cutoff device to manufacture a corrugated cardboard sheet.

The bottom liner, the medium, and the top liner are each corrugated cardboard base paper supplied from a base paper roll. The corrugated cardboard base paper is a web, which is wound into roll form to be a base paper roll. A mill roll stand holds a plurality of base paper rolls and rotates forward one base paper roll to supply the corrugated cardboard base paper. When the corrugated cardboard base paper in the base paper roll runs short, the mill roll stand splices corrugated cardboard based paper of a standby base paper roll to the corrugated cardboard base paper being supplied, thereby enabling continuous supply of the corrugated cardboard base paper.

After paper splicing of the corrugated cardboard base paper, the cut, used base paper roll rotates backward to wind the corrugated cardboard base paper that has been drawn out, and its leading edge is fixed to the outer peripheral face of the base paper roll with adhesive tape. Such a device for processing a base paper roll is, for example, described in Patent Literature 1.

CITATION LIST

Patent Literature

Patent Literature 1: Japanese Patent No. 2971264

SUMMARY

Technical Problem

In the technology described in Patent Literature 1, the diameter of the base paper roll is calculated, a winding amount is calculated from the diameter of the base paper roll and the number of revolutions of a rolling center, and the winding speed of the corrugated cardboard base paper is controlled in accordance with the winding amount. A microswitch then detects the leading edge of the corrugated cardboard base paper and activates a taping device. The rolling center inserts a pair of chucks into both sides of a medium tube in the axial direction to support the base paper roll. When the paper splicing operation of the corrugated cardboard base paper is performed, it is necessary to stop the rotation of the corrugated cardboard base paper being supplied via the chucks, and slippage occurs between the chucks and the medium tube, causing a gap between the rotation position (the number of revolutions) of the rolling center and the rotation position (the number of revolutions) of the base paper roll. In addition, the corrugated cardboard base paper drawn out of the base paper roll being supplied remains longer than its original length inside the machine, causing sagging and wrinkling inside the machine. In addition, an error occurs between the winding amount of the base paper roll calculated based on a detection result of a detection device and an actual winding amount. To properly detect the leading edge of the corrugated cardboard base paper, speed control near the leading edge is performed, but due to the error, an actual edge does not reach a detection unit, resulting in reduced detection accuracy, and there is a possibility that the tape cannot be properly affixed.

The present disclosure is to solve the problem described above, and an object thereof is to provide a device and a method for processing a base paper roll that can properly wind and precisely fix corrugated cardboard base paper that has been drawn out of a base paper roll and a device for manufacturing a corrugated cardboard sheet.

Solution to Problem

In order to achieve the above object, a device for processing a base paper roll according to the present disclosure includes: a winding device that winds corrugated cardboard base paper drawn out by rotating a base paper roll; a paper leading edge detection unit that detects a leading edge of the corrugated cardboard base paper wound by the winding device; a taping device that fixes the leading edge of the wound corrugated cardboard base paper to an outer peripheral face of the base paper roll with adhesive tape; and a control unit that controls a rotation speed of the base paper roll based on an arrival direction of the leading edge of the corrugated cardboard base paper with respect to the taping device on the outer peripheral face of the base paper roll when the paper leading edge detection unit detects the leading edge of the corrugated cardboard base paper, and activates the taping device after controlling the rotation speed of the base paper roll.

Further, a method for processing a base paper roll according to the present disclosure includes the steps of: winding corrugated cardboard base paper drawn out by rotating a base paper roll; detecting a leading edge of the corrugated cardboard base paper to be wound; controlling a rotation speed of the base paper roll based on an arrival direction of the leading edge of the corrugated cardboard base paper with respect to a taping device on an outer peripheral face of the base paper roll; and activating the taping device after controlling the rotation speed of the base paper roll to fix the leading edge of the wound corrugated cardboard base paper to the outer peripheral face of the base paper roll with adhesive tape.

Further, a device for manufacturing a corrugated cardboard sheet according to the present disclosure includes: mill roll stands that each rotatably support a bottom liner, a medium, and a top liner; a single facer that laminates the top liner on the corrugated medium to manufacture a single-faced web; a double facer that laminates the bottom liner on the medium of the single-faced web to manufacture a corrugated cardboard sheet; and the above-described device for processing a base paper roll.

Advantageous Effects of Invention

According to the device and the method for processing a base paper roll and the device for manufacturing a corrugated cardboard sheet of the present disclosure, the corrugated cardboard base paper that has been drawn out of the base paper roll can be properly wound and precisely fixed.

DESCRIPTION OF EMBODIMENTS

The following describes a preferred embodiment of the present disclosure in detail with reference to the accompanying drawings. The disclosure is not limited by this embodiment, and if there are a plurality of embodiments, a combination of the embodiments is also included. Components in the embodiment include those that can be easily thought of by those skilled in the art, those that are substantially identical, and those in what is called the range of equivalence.

Present Embodiment

<Corrugating Machine>

Figure 1:
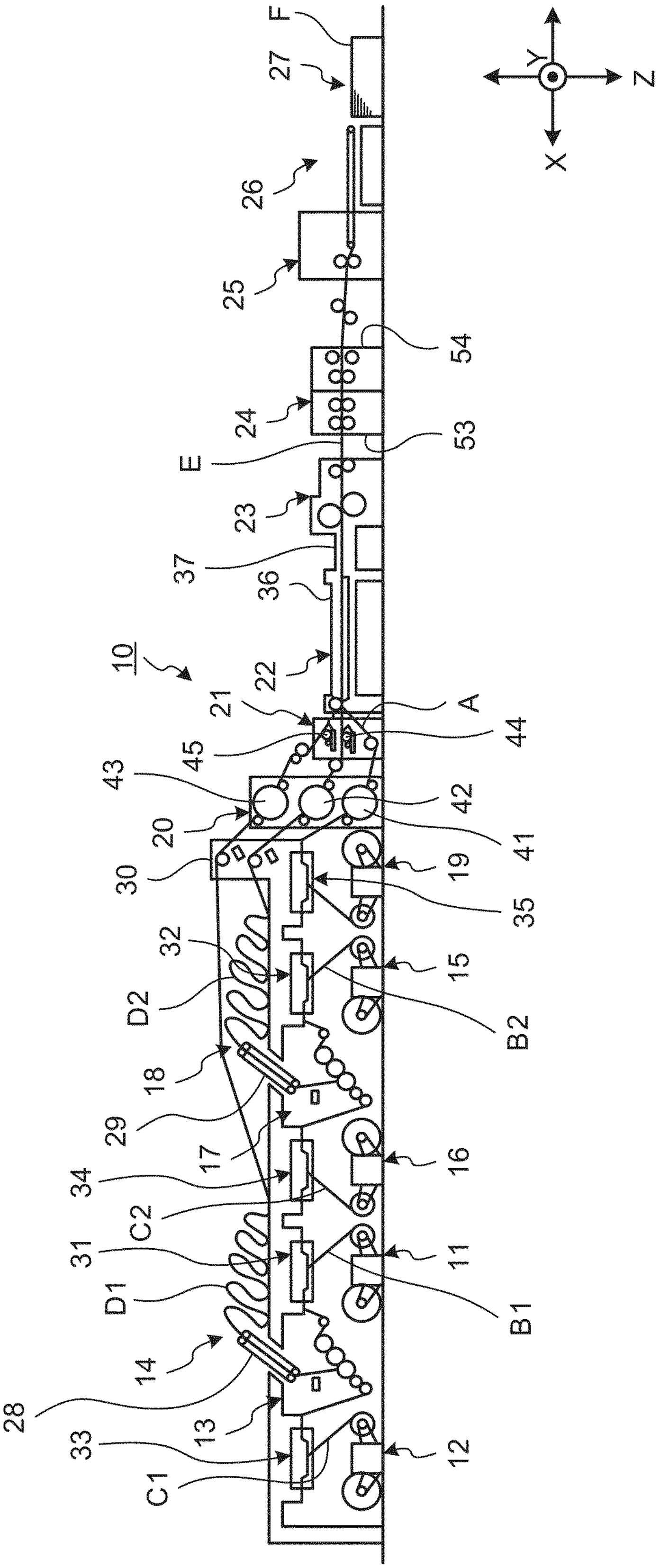
FIG. 1 is a schematic diagram of a corrugating machine of the present embodiment.

The device for manufacturing a corrugated cardboard sheet of the present embodiment is used for a corrugating machine. FIG. 1 is a schematic diagram of the corrugating machine. The following description will be given with the longitudinal direction of the corrugating machine as an X direction, the horizontal direction orthogonal to the longitudinal direction of the corrugating machine (the X direction) as a Y direction (a width direction of a corrugated cardboard sheet), and the vertical direction (a thickness direction of the corrugated cardboard sheet) orthogonal to the longitudinal direction of the corrugating machine (the X direction) as a Z direction. Corrugated cardboard base paper corresponds to any of a bottom liner, a medium, and a top liner.

As illustrated in FIG. 1, this corrugating machine 10 first laminates a top liner C1 on a corrugated medium B1 to manufacture a single-faced web D1 and also laminates a top liner C2 on a corrugated medium B2 to manufacture a single-faced web D2. Next, the top liner C2 of the single-faced web D2 is laminated on the medium B1 of the manufactured single-faced web D1, and also a bottom liner A is laminated on the medium B2 of the single-faced web D2 to manufacture a continuous duplex single-wall corrugated cardboard sheet. The continuous duplex single-wall corrugated cardboard sheet is then cut into a certain length to manufacture a board-shaped duplex single-wall corrugated cardboard sheet.

The corrugating machine 10 can also manufacture a single-wall corrugated cardboard sheet by laminating the single-faced web D2 or the single-faced web D1 with the bottom liner A. Given these circumstances, in the following description, the single-wall corrugated cardboard sheet and the duplex single-wall corrugated cardboard sheet will be described collectively referred to as a single-wall corrugated cardboard sheet E. The board-shaped single-wall corrugated cardboard sheet and the board-shaped duplex single-wall corrugated cardboard sheet will be described collectively referred to as a single-wall corrugated cardboard sheet F.

The corrugating machine 10 includes a mill roll stand 11 for the medium B1, a mill roll stand 12 for the top liner C1, a single facer 13, a bridge 14, a mill roll stand 15 for the medium B2, a mill roll stand 16 for the top liner C2, a single facer 17, a bridge 18, a mill roll stand 19 for the bottom liner A, a preheater 20, a glue machine 21, a double facer 22, a rotary shear 23, a slitter scorer 24, a cutoff 25, a waste removing device 26, and a stacker 27.

The mill roll stands 11 and 15 are installed with pieces of roll paper in which the mediums B1 and B2 are wound in roll form on both sides in the X direction, and splicers 31 and 32 performing paper splicing are provided between the pieces of roll paper. During paper feed from one roll paper, the other roll paper is installed to prepare for paper splicing. When the one roll paper runs short, the splicers 31 and 32 splice the other roll paper to the one roll paper. Thus, the mediums B1 and B2 are continuously fed from the mill roll stands 11 and 15 toward the downstream side.

The mill roll stands 12 and 16 are installed with pieces of roll paper in which the top liners C1 and C2 are wound in roll form on both sides in the X direction, and splicers 33 and 34 performing paper splicing are provided between the pieces of roll paper. During paper feed from one roll paper, the other roll paper is installed to prepare for paper splicing. When the one roll paper runs short, the splicers 33 and 34 splice the other roll paper to the one roll paper. Thus, the top liners C1 and C2 are continuously fed from the mill roll stands 12 and 16 toward the downstream side.

The mediums B1 and B2 drawn out of the mill roll stands 11 and 15 and the top liners C1 and C2 drawn out of the mill roll stands 12 and 16 are each preheated by a preheater not shown. Each preheater has a heating roll supplied with steam thereinside, and the medium B1 and B2 and the top liners C1 and C2 are conveyed wound on the heating roll to raise the temperature to a certain temperature.

The single facer 13 corrugates the heated medium B1, then applies glue to the apexes of the corrugated shape, and laminates the heated liner C1 thereon to form the single-faced web D1. The single facer 13 is provided with a take-up conveyor 28 at the exit of the single-faced web D1, which conveys the single-faced web D1 formed by the single facer 13 to the bridge 14. The bridge 14 temporarily retains the single-faced webs D1 in order to absorb the speed difference between the single facer 13 and the double facer 22.

The single facer 17 corrugates the heated medium B2, then applies glue to the apexes of the corrugated shape, and laminates the heated liner C2 thereon to form the single-faced web D2. The single facer 17 is provided with a take-up conveyor 29 at the exit of the single-faced web D2, which conveys the single-faced web D2 formed by the single facer 17 to the bridge 18. The bridge 18 temporarily retains the single-faced webs D2 in order to absorb the speed difference between the single facer 17 and the double facer 22.

A paper guide device 30 is provided at the exit of the bridge 14 and the bridge 18. The paper guide device 30 adjusts the positions of the single-faced web D1 and the single-faced web D2 in the Y-direction between the bridge 14 and the bridge 18 and the double facer 22.

The mill roll stand 19 is installed with pieces of roll paper in which the bottom liner A is wound in roll form on both sides in the X direction, and a splicer 35 performing paper splicing is provided between the pieces of roll paper. During paper feed from one roll paper, the other roll paper is installed to prepare for paper splicing. When the one roll paper runs short, the splicer splices the other roll paper to the one roll paper. Thus, the bottom liner A is continuously fed from the mill roll stand 19 toward the downstream side.

In the preheater 20, three preheating rolls 41, 42, and 43 are disposed in a row in the Z direction. The preheating roll 41 heats the bottom liner A, the preheating roll 42 heats the single-faced web D2, and the preheating roll 43 heats the single-faced web D1. The preheating rolls 41, 42, and 43 each have a winding amount adjustment device (not shown) and are supplied with steam thereinside to be heated to a certain temperature to preheat the bottom liner A, the single-faced web D2, and the single-faced web D1 as they are wound onto their peripheral faces.

In the glue machine 21, gluing rolls 44 and 45 are disposed in a row in the Z direction. The gluing roll 44 makes contact with the apexes of the corrugated shape of the medium B2 in the single-faced web D2 heated by the preheating roll 42 to apply glue. The gluing roll 45 makes contact with the apexes of the corrugated shape of the medium B1 in the single-faced web D1 heated by the preheating roll 43 to apply glue. The single-faced webs D1 and D2 with glue applied by glue machine 21 are transferred to the double facer 22, which is the next process. The bottom liner A heated by the preheating roll 41 is also transferred to the double facer 22 through the glue machine 21.

The double facer 22 has an upstream heating section 36 and a downstream cooling section 37 along the travel line of the single-faced webs D1 and D2 and the bottom liner A. The single-faced webs D1 and D2 and the bottom liner A, to which glue has been applied by the glue machine 21, are brought in between a pressurizing belt and a heating plate in the heating section 36 and are transferred toward the cooling section 37 integrally overlapping each other. During this transfer, the single-faced webs D1 and D2 and the bottom liner A are heated while being pressurized to be laminated to each other to form the continuous single-wall corrugated cardboard sheet E, which is then naturally cooled while being conveyed.

The single-wall corrugated cardboard sheet E manufactured by the double facer 22 is transferred to the slitter scorer 24. The slitter scorer 24 cuts the wide double-sided corrugated cardboard sheet E along the X direction such that it has a certain width and also forms creasing extending in the X direction. The slitter scorer 24 includes a first slitter scorer unit 53 and a second slitter scorer unit 54, which have substantially the same structure arranged along the X direction of the single-wall corrugated cardboard sheet E. The wide single-wall corrugated cardboard sheet E is cut by the slitter scorer 24 to form the single-wall corrugated cardboard sheet E with a certain width.

The cutoff 25 cuts the single-wall corrugated cardboard sheet E cut in the X direction by the slitter scorer 24 along the Y direction to form the board-shaped single-wall corrugated cardboard sheet F with a certain length. The waste removing device 26 discharges the single-wall corrugated cardboard sheet F determined to be waste (a defective item) by a defective detection device described below from the conveyance line. The waste removing device 26 has a discharge conveyor and a sorting roll, which are not shown. When the board-shaped single-wall corrugated cardboard sheet F determined to be a defective item is conveyed, the sorting roll lowers to sort the defective board-shaped single-wall corrugated cardboard sheet F to the discharge conveyor to be discharged. The stacker 27 stacks single-wall corrugated cardboard sheets F determined to be non-defective items and discharges them outside the machine as products.

<Splicer>

Figure 2:
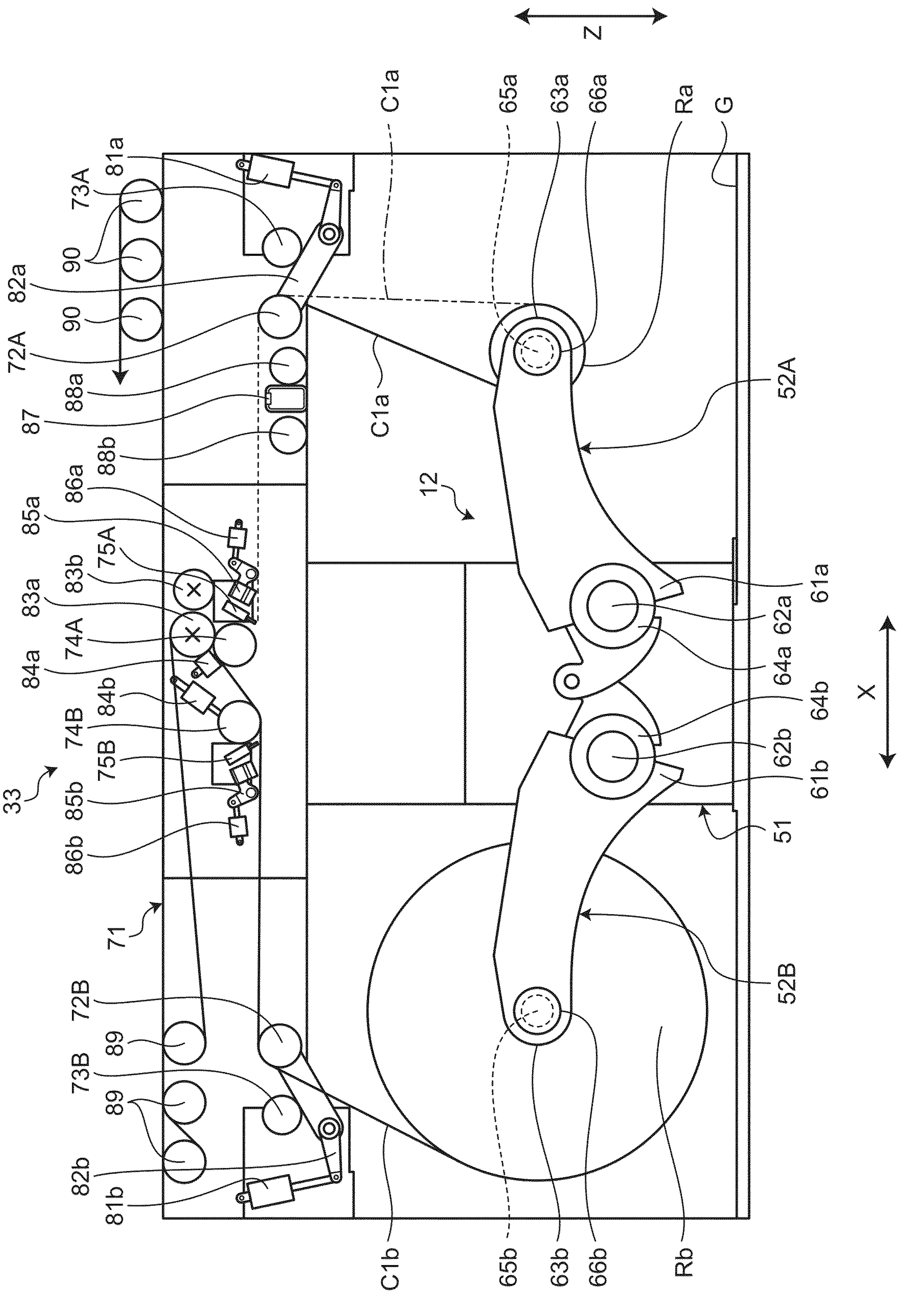
FIG. 2 is a schematic diagram of a splicer.

FIG. 2 is a schematic diagram of a splicer. The splicers 31, 32, 33, 34, and 35 have almost the same configuration, and thus the following describes the splicer 33 performing paper splicing of the top liner C1 supported by the mill roll stand 12, with the descriptions of the other splicers 31, 32, 34, and 35 omitted.

As illustrated in FIG. 2, the mill roll stand 12 has a support frame 51, a first support arm 52A, and a second support arm 52B. The mill roll stand 12 rotatably supports base paper rolls Ra and Rb in which the top liner C1 as the corrugated cardboard base paper is wound.

The support frame 51 is installed on a floor surface G. In the first support arm 52A, a basal end portion 61*a* is rotatably supported on the support frame 51 by a rotary shaft 62*a*, and a distal end portion 63*a* extends to one side in the X direction (to the right in FIG. 2). In the second support arm 52B, a basal end portion 61*b* is rotatably supported on the support frame 51 by a rotary shaft 62*b*, and a distal end portion 63*b* extends to the other side in the X direction (to the left in FIG. 2). First support arms 52A form a pair spaced apart in the axial direction of the base paper roll Ra (the Y direction) and are coupled together by the rotary shaft 62*a*. The pair of first support arms 52A can be integrally rotated by a drive device 64*a* and can freely approach to each other and separate from each other by a moving device (not shown). Second support arms 52B form a pair spaced apart in the axial direction of the base paper roll Rb (the Y direction) and are coupled together by the rotary shaft 62*b*. The pair of second support arms 52B can be integrally rotated by a drive device 64*b* and can freely approach to each other and separate from each other by a moving device (not shown).

The pair of first support arms 52A are each provided with a chuck (rolling center) 65*a* so as to face each distal end portion 63*a*. The first support arm 52A is provided with a drive device 66*a* at the distal end portion 63*a*. A pair of chucks 65*a* can fit into and lock a medium tube (not shown) of the base paper roll Ra. The drive device 66*a* can rotate forward and rotate backward the base paper roll Ra via the pair of chucks 65*a*. The pair of second support arms 52B are each provided with a chuck (rolling center) 65*b* so as to face each distal end portion 63*b*. The second support arm 52B is provided with a drive device 66*b* at the distal end portion 63*b*. A pair of chucks 65*b* can fit into and lock a medium tube (not shown) of the base paper roll Rb. The drive device 66*b* can rotate forward and rotate backward the base paper roll Rb via the pair of chucks 65*b*.

The splicer 33 is disposed above the mill roll stand 12. The splicer 33 includes a stand 71, a first support roll (support member) 72A, a second support roll (support member) 72B, a first introduction roll 73A, a second introduction roll 73B, a first compression bonding roll 74A, a second compression bonding roll 74B, a first knife 75A, and a second knife 75B. However, the first support roll 72A and the second support roll 72B are not limited to rolls and are only required to be able to support the top liners C1*a* and C1*b*.

The stand 71 is fixed to the top of the support frame 51. The stand 71 is disposed with the first support roll 72A, the second support roll 72B, the first introduction roll 73A, the second introduction roll 73B, the first compression bonding roll 74A, the second compression bonding roll 74B, the first knife 75A, and the second knife 75B.

The first support roll 72A is disposed above the base paper roll Ra supported on the first support arm 52A. The first support roll 72A is rotatable and can oscillate along the Z direction by an oscillating cylinder 81*a* via a link 82*a*. The first introduction roll 73A is disposed adjacent to the first support roll 72A, is rotatable, and can move and oscillate along the X direction. The second support roll 72B is disposed above the base paper roll Rb supported on the second support arm 52B. The second support roll 72B is rotatable and can oscillate along the Z direction by an oscillating cylinder 81*b* via a link 82*b*. The second introduction roll 73B is disposed adjacent to the second support roll 72B, is rotatable, and can move and oscillate along the X direction.

A pair of nip rolls 83*a* and 83*b* are disposed in the middle part of the stand 71 in the X direction. The nip rolls 83*a* and 83*b* are rotatable and can approach to each other and separate from each other. The first compression bonding roll 74A is disposed below the nip roll 83*a*, is rotatable, and is movable by a compression bonding cylinder 84*a*. The second compression bonding roll 74B is disposed spaced apart from the first compression bonding roll 74A in the X direction, is rotatable, and is movable by a compression bonding cylinder 84*b*. The first knife 75A is disposed adjacent to the first compression bonding roll 74A, and the second knife 75B is disposed adjacent to the second compression bonding roll 74B. Adjacent to the first knife 75A, a pressing member 85*a* is movably supported by a pressing cylinder 86*a*. Adjacent to the second knife 75B, a pressing member 85*b* is movably supported by a pressing cylinder 86*b*. In addition, a pressing stand 87 and pressing rolls 88*a* and 88*b* are supported movably along the X direction.

The stand 71 is also provided with a plurality of (in the present embodiment, three) fixed rolls 89 and a plurality of (in the present embodiment, three) dancer rolls 90 at the top. The fixed rolls 89 are rotatably supported. The dancer rolls 90 are rotatably supported and are supported movably along the X direction in accordance with the tension of the top liners C1*a* and C1*b*.

Thus, when the base paper roll Ra rotates clockwise in FIG. 2, the top liner C1*a* is drawn out of the base paper roll Ra. The drawn-out liner C1*a* is guided by the first support roll 72A and conveyed along the X direction to be supplied via the first compression bonding roll 74A, the nip rolls 83*a* and 83*b*, the fixed rolls 89, and the dancer rolls 90. When the top liner C1*a* of the base paper roll Ra is reduced, paper splicing is performed between the top liner C1*a* of the base paper roll Ra and the top liner C1*b* from the base paper roll Rb.

First, the second support roll 72B oscillates downward and moves to the middle position of the stand 71 in the X direction with the second introduction roll 73B and the pressing roll 88*b* (the pressing stand 87) holding the leading edge of the top liner C1*b*. Next, the rotation of the base paper roll Ra is stopped to stop supply of the top liner C1*a*. In this process, the dancer rolls 90 move to continue supply of the retained liner C1*a* while keeping the tension of the top liner C1*a* constant. Then, the compression bonding cylinder 84*a* moves the first compression bonding roll 74A downward to press it against the second introduction roll 73B, and the leading edge of the top liner C1*b* is caused to adhere to the top liner C1*a* with single-wall tape (not shown). At the same time, the pressing cylinder 86*b* activates the pressing member 85*b*, which presses the top liner C1*a* between it and the pressing stand 87. In this state, the first knife 75A is activated to cut the top liner C1*a*. Subsequently, when the base paper roll Rb rotates clockwise in FIG. 2, the top liner C1*b* connected to the top liner C1*a* is drawn out, and the drawn-out liner C1*b* is transported along the X direction guided by the second support roll 72B and is supplied via the second compression bonding roll 74B, the nip rolls 83*a* and 83*b*, the fixed rolls 89, and the dancer rolls 90. The dancer rolls 90 then move to return to their original positions.

By the way, when the base paper roll Ra rotates to supply the top liner C1*a*, when the winding amount of the top liner C1*a* in the base paper roll Ra decreases, the top liner C1*b* is spliced to the top liner C1*a* to start supply of the top liner C1*b* from the base paper roll Rb, which has been on standby. In this process, the used base paper roll Ra rotates backward to wind the top liner C1*a* that has been drawn out, and its leading edge is fixed to the outer peripheral face of the base paper roll Ra with adhesive tape.

<Schematic Configuration of Device for Processing Base Paper Roll>

Figure 3:
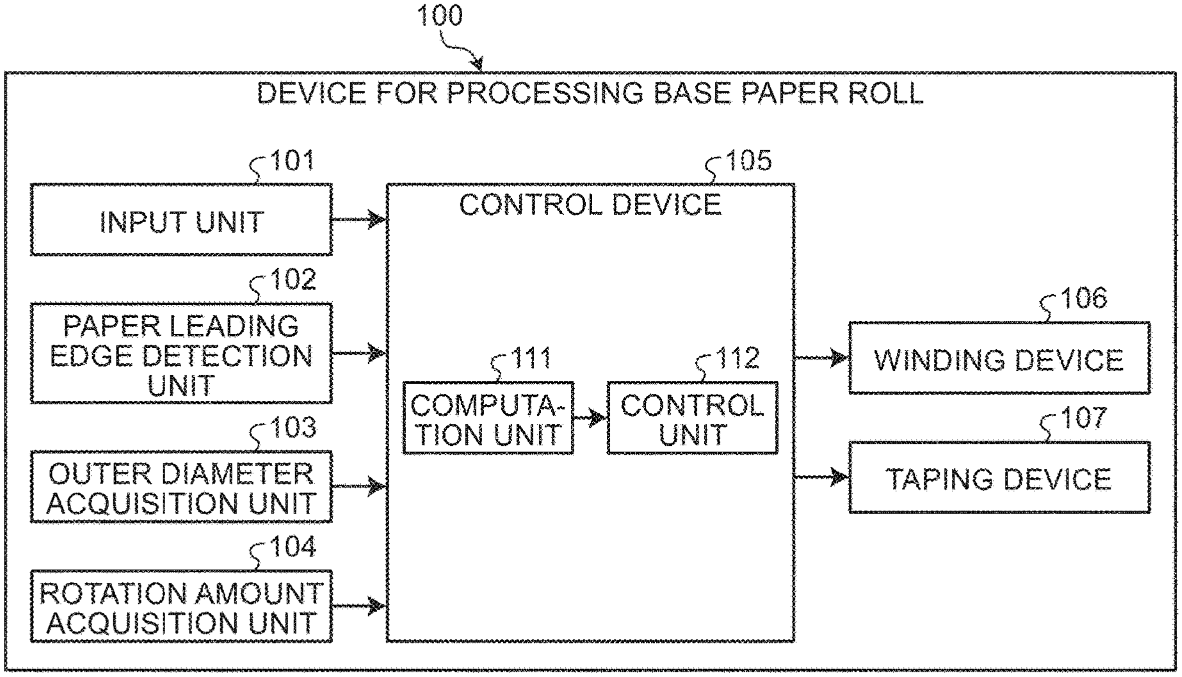
FIG. 3 is a schematic configuration diagram of a device for processing a base paper roll of the present embodiment.

FIG. 3 is a schematic configuration diagram of a device for processing a base paper roll of the present embodiment.

As illustrated in FIG. 3, this device 100 for processing a base paper roll rotates backward the used base paper rolls Ra and Rb to wind the top liners C1*a* and C1*b* and fixes the leading edges of the top liners C1*a* and C1*b* to the outer peripheral faces of the base paper rolls Ra and Rb with adhesive tape.

The device 100 for processing a base paper roll includes an input unit 101, a paper leading edge detection unit 102, an outer diameter acquisition unit 103, a rotation amount acquisition unit 104, a control device 105, a winding device 106, and a taping device 107.

The input unit 101 is connected to the control device 105. The input unit 101 can input certain command signals to the control device 105 by being operated by an operator. The input unit 101 is, for example, a keyboard or a touch type display. The input unit 101 can also input a paper splicing command signal to the control device 105. Upon reception of input of the paper splicing command signal, the control device 105 activates the splicer 33.

The paper leading edge detection unit 102 is connected to the control device 105. The paper leading edge detection unit 102 detects the leading edges of the top liners C1*a* and C1*b* wound by the winding device 106. The paper leading edge detection unit 102 is a photoelectric sensor. The photoelectric sensor emits light such as a visible ray or an infrared ray from a light emitting unit and detects a change in the amount of light reflected or blocked by the top liners C1*a* and C1*b*, which are objects to be detected, by a light receiving unit to obtain an output signal. The paper leading edge detection unit 102, for example, makes the output signal on when the top liners C1*a* and C1*b* are detected and makes the output signal off when the top liners C1*a* and C1*b* are not detected. The paper leading edge detection unit 102 outputs a detection result to the control device 105. The paper leading edge detection unit 102 is not limited to the photoelectric sensor and may also be, for example, an ultrasonic sensor, a laser sensor, or the like.

The outer diameter acquisition unit 103 is connected to the control device 105. The outer diameter acquisition unit 103 measures the outer diameters of the base paper rolls Ra and Rb. The outer diameter acquisition unit 103 is a laser sensor. The laser sensor emits laser light from a light emitting unit, detects the laser light reflected by the outer peripheral faces of the base paper rolls Ra and Rb, which are objects to be detected, by a light receiving unit, and detects a time of the laser light from emission to the light receiving unit to obtain position signals of the outer peripheral faces of the base paper rolls Ra and Rb. The outer diameter acquisition unit 103 outputs a measurement result to the control device 105. The control device 105, to which position signals of the centers of the base paper rolls Ra and Rb based on the distances from the outer diameter acquisition unit 103 to the centers of the base paper rolls Ra and Rb have been input, calculates the outer diameters of the base paper rolls Ra and Rb based on the position signals of the outer peripheral faces and the position signals of the centers of the base paper rolls Ra and Rb. The outer diameter acquisition unit 103 is not limited to the laser sensor and may also be, for example, an ultrasonic sensor. The outer diameter acquisition unit 103 may calculate the remaining lengths of the used base paper rolls Ra and Rb based on the lengths of the top liners C1*a* and C1*b* drawn out in manufacturing the corrugated cardboard sheet and then calculate the outer diameters of the base paper rolls Ra and Rb from the remaining lengths of the used base paper rolls Ra and Rb.

The rotation amount acquisition unit 104 is connected to the control device 105. The rotation amount acquisition unit 104 measures the rotation amounts (rotation angles) of the base paper rolls Ra and Rb. As illustrated in FIG. 2, the mill roll stand 12 has the chucks 65*a* and 65*b* at the distal end portions 63*a* and 63*b* of the first support arm 52A and the second support arm 52B and can support the base paper rolls Ra and Rb by the chucks 65*a* and 65*b*. The first support arm 52A and the second support arm 52B have the drive devices 66*a* and 66*b* at the distal end portions 63*a* and 63*b* and can rotate the base paper rolls Ra and Rb by the drive devices 66*a* and 66*b*. Here, the drive devices 66*a* and 66*b* are servo motors, and encoders detect the rotation speeds of the chucks 65*a* and 65*b* (the base paper rolls Ra and Rb). The rotation amount acquisition unit 104 is an encoder of a servo motor. The rotation amount acquisition unit 104 outputs a detection result to the control device 105. The rotation amount acquisition unit 104 is not limited to the encoder of the servo motor, and an encoder measuring the rotation amounts (rotation angles) of the chucks 65*a* and 65*b* may be separately provided.

The control device 105 includes a computation unit 111 and a control unit 112. The computation unit 111 calculates an activation starting time of the taping device 107 based on the detection result of the paper leading edge detection unit 102. In this case, the computation unit 111 calculates the activation starting time when the paper leading edge detection unit 102 detects the leading edges of the top liners C1*a* and C1*b* after winding of the top liners C1*a* and C1*b* is started by starting rotation of the base paper rolls Ra and Rb and then the rotation speeds of the base paper rolls Ra and Rb reach certain speeds set in advance. The control unit 112 activates the taping device 107 at the activation starting time calculated by the computation unit 111.

Specifically, the computation unit 111 calculates the activation starting time based on the detection result of the paper leading edge detection unit 102, the measurement result of the outer diameter acquisition unit 103, and the detection result of the rotation amount acquisition unit 104. In this case, the rotation amount acquisition unit 104 calculates a distance for the leading edges of the top liners C1*a* and C1*b* to reach the activation starting time of the taping device 107 from the detection position of the paper leading edge detection unit 102, that is, what rotation amounts (rotation angles) of the top liners C1*a* and C1*b* are required in order for the leading edges of the top liners C1*a* and C1*b* to reach a certain distance from the taping device 107. The computation unit 111 calculates a speed reduction starting time to reduce the rotation speeds of the base paper rolls Ra and Rb at a prior activation starting time that is before the activation starting time, and the control unit 112 reduces the rotation of the base paper rolls Ra and Rb by the drive devices 66*a* and 66*b* at the speed reduction starting time. The rotation amount acquisition unit 104 may calculate the rotation amounts (rotation angles) of the top liners C1*a* and C1*b* and then calculate how much time is required from the rotation speeds of the top liners C1*a* and C1*b* for the leading edges of the top liners C1*a* and C1*b* to reach the activation starting time of the taping device 107 from the detection position of the paper leading edge detection unit 102.

The control device 105 is a controller and is implemented by, for example, various computer programs stored in a memory unit being executed with a random access memory (RAM) as a work area by a central processing unit (CPU), a micro processing unit (MPU), or the like.

The winding device 106 is connected to the control device 105. The winding device 106 is activated when an activation command signal is input from the control device 105. The winding device 106 rotates the base paper rolls Ra and Rb to wind the drawn-out liners C1*a* and C1*b*. The winding device 106 is configured as a partial component of the mill roll stand 12. That is, the winding device 106 has at least the first support arm 52A and the second support arm 52B, the chucks 65*a* and 65*b*, and the drive devices 66*a* and 66*b*.

The taping device 107 is connected to the control device 105. The taping device 107 is activated when an activation command signal is input from the control device 105. The taping device 107 fixes the leading edges of the wound top liners C1*a* and C1*b* to the outer peripheral faces of the base paper rolls Ra and Rb with adhesive tape. The details of the taping device 107 will be described below.

<Taping Device>

Figure 4:
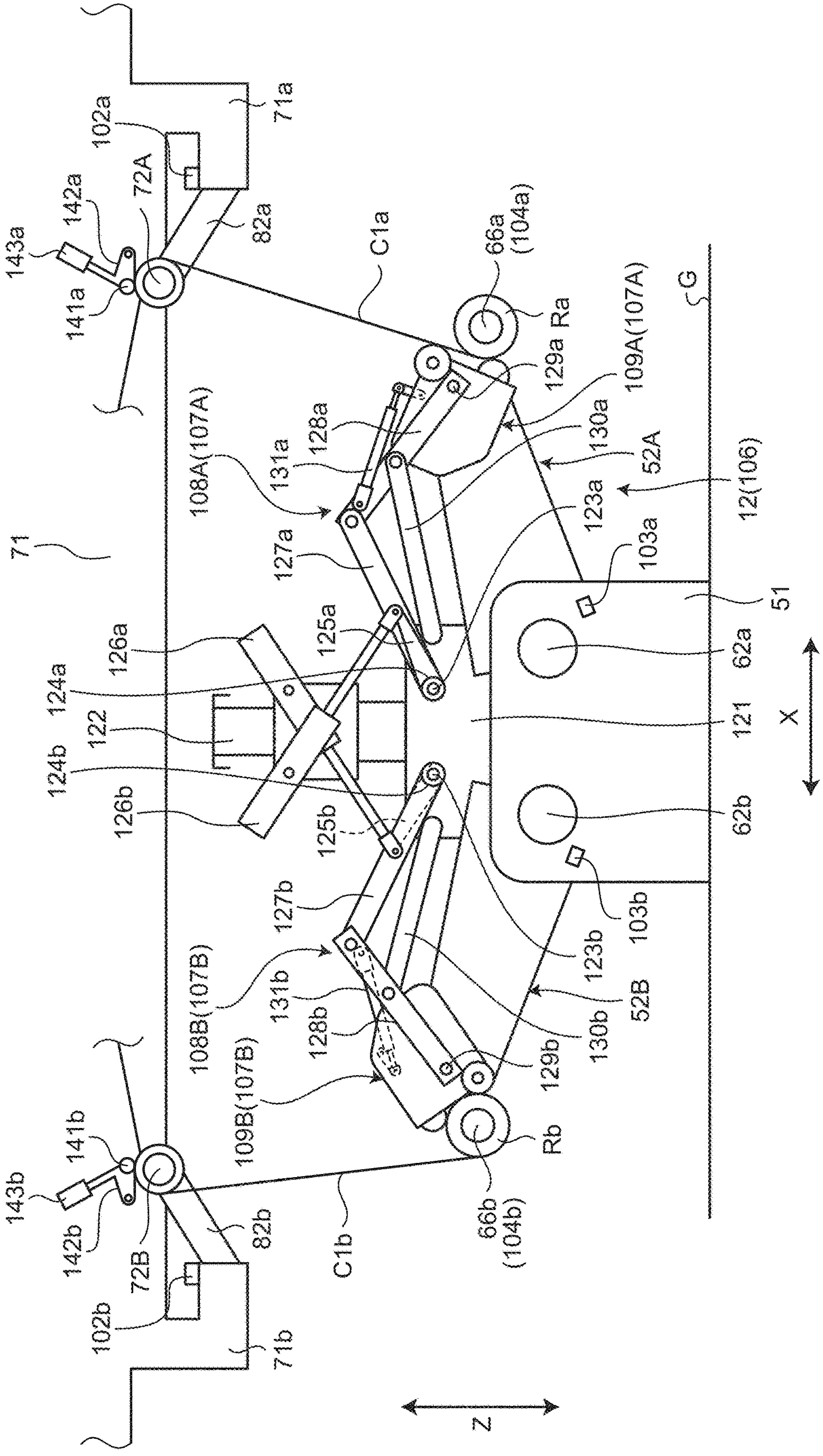
FIG. 4 is a schematic front view of a taping device.
Figure 5:
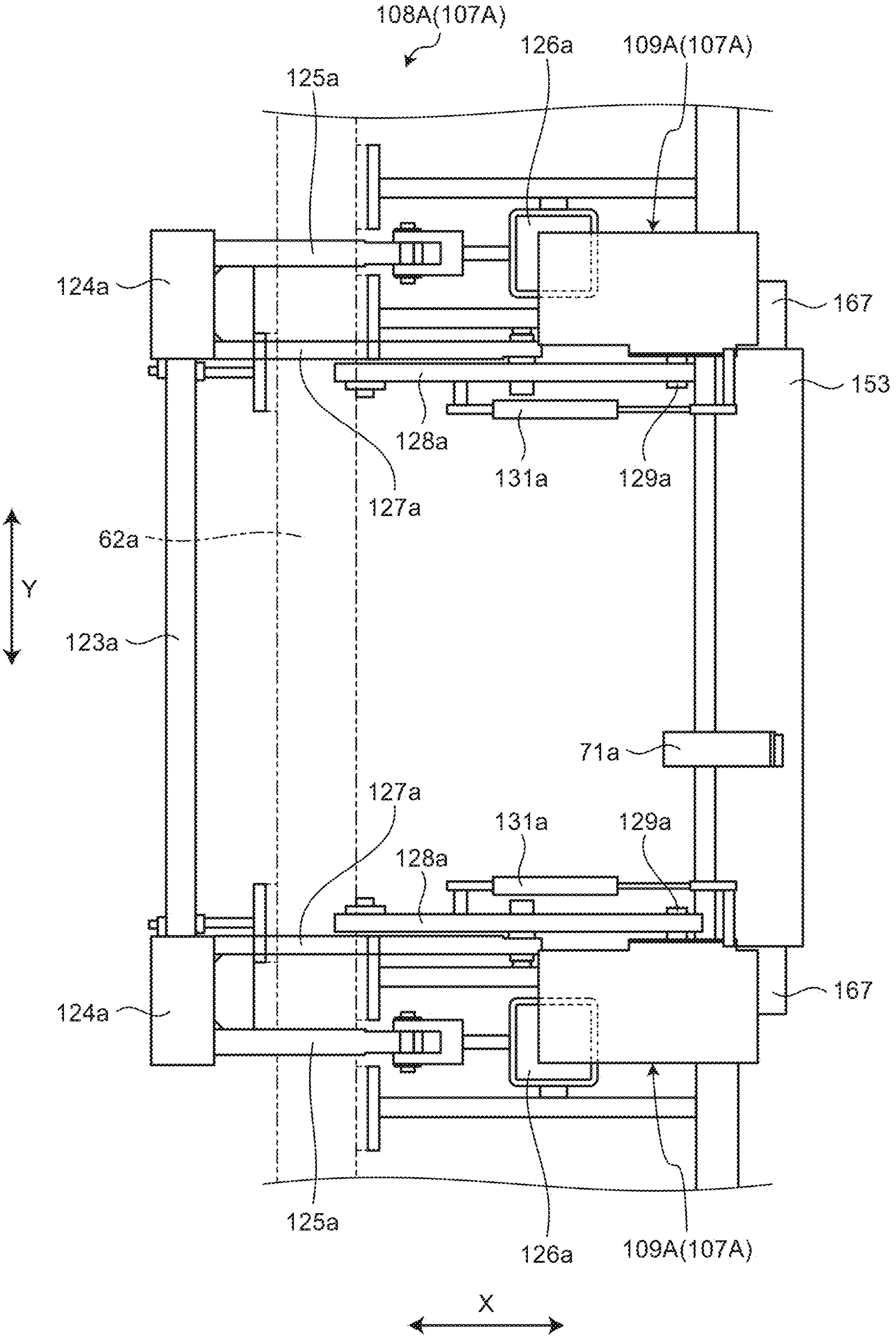
FIG. 5 is a schematic side view of the taping device.
Figure 6:
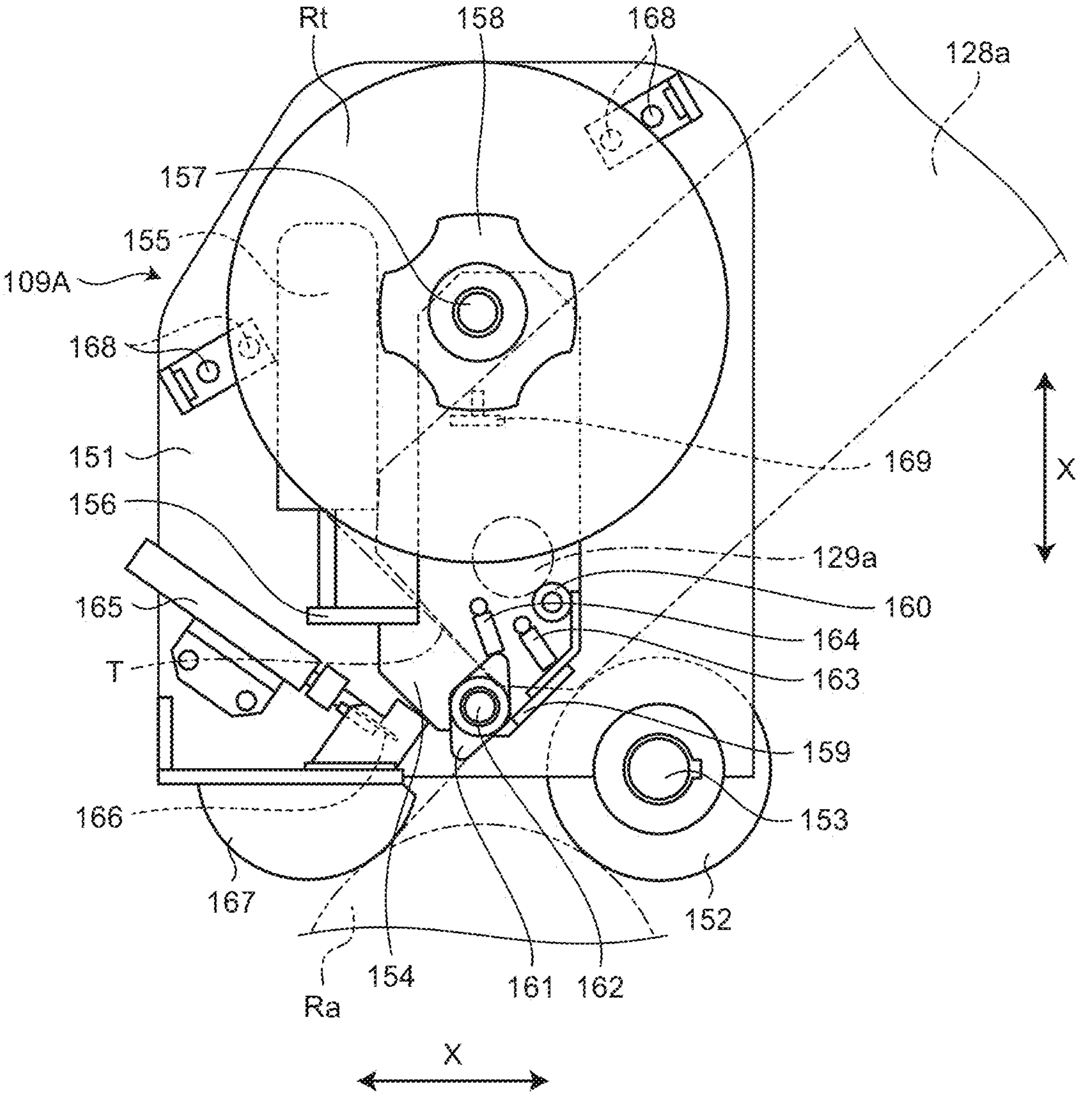
FIG. 6 is a schematic diagram of the taping device main body.

FIG. 4 is a schematic front view of a taping device, FIG. 5 is a schematic side view of the taping device, and FIG. 6 is a schematic diagram of the taping device main body.

As illustrated in FIG. 4 and FIG. 5, the taping device 107 has a first taping device 107A disposed closer to the first support arm 52A supporting the base paper roll Ra (the top liner C1*a*) and a second taping device 107B disposed closer to the second support arm 52B supporting the base paper roll Rb (the top liner C1*b*). The first taping device 107A and the second taping device 107B are almost symmetrical in structure. The taping devices 107A and 107B have main body support devices 108A and 108B and taping device main bodies 109A and 109B, respectively.

By the main body support devices 108A and 108B, a first frame 121 and a second frame 122 are fixed to the top of the support frame 51. Synchronous shafts 123*a* and 123*b* are rotatably supported on the first frame 121 along the Y direction at positions above the respective rotary shafts 62*a* and 62*b* of the first support arm 52A and the second support arm 52B. Sleeves 124*a* and 124*b* are fixed at respective ends of the synchronous shafts 123*a* and 123*b* in the axial direction. First links 125*a* and 125*b* are fixed to the sleeves

124*a* and 124*b* at their respective basal end portions. Elevating cylinders 126*a* and 126*b* are rotatably supported on the second frame 122. The distal end portions of drive rods of the elevating cylinders 126*a* and 126*b* are rotatably coupled to the distal end portions of the first links 125*a* and 125*b*.

The basal end portions of second links 127*a* and 127*b* are fixed to the sleeves 124*a* and 124*b*. The basal end portions of third links 128*a* and 128*b* are rotatably coupled to the distal end portions of the second links 127*a* and 127*b*, and the distal end portions of the third links 128*a* and 128*b* are rotatably coupled to the taping device main bodies 109A and 109B by coupling shafts 129*a* and 129*b*. The basal end portions of fourth links 130*a* and 130*b* are rotatably coupled to the first frame 121, and the distal end portions of the fourth links 130*a* and 130*b* are rotatably coupled to the middle parts of the third links 128*a* and 128*b*. Oscillating cylinders 131*a* and 131*b* are rotatably supported on the third links 128*a* and 128*b*, and the distal end portions of drive rods of the oscillating cylinders 131*a* and 131*b* are rotatably coupled to the taping device main bodies 109A and 109B.

The first links 125*a*, the first links 125*b*, the elevating cylinders 126*a*, the elevating cylinders 126*b*, the second links 127*a*, the second links 127*b*, the third links 128*a*, the third links 128*b*, the fourth links 130*a*, the fourth links 130*b*, the oscillating cylinders 131*a*, and the oscillating cylinders 131*b*, each making a pair, are provided spaced apart in the Y direction.

Thus, when the elevating cylinders 126*a* and 126*b* are extended and retracted, the synchronous shafts 123*a* and 123*b* rotate via the first links 125*a* and 125*b*, and thus the second links 127*a* and 127*b*, the third links 128*a* and 128*b*, and the fourth links 130*a* and 130*b* oscillate, so that the taping device main bodies 109A and 109B are lifted and lowered. By extending and retracting the oscillating cylinders 131*a* and 131*b*, the taping device main bodies 109A and 109B oscillate with the coupling shafts 129*a* and 129*b* as supports.

The first support roll 72A and the second support roll 72B are disposed on the stand 71 above the base paper rolls Ra and Rb supported on the first support arm 52A and the second support arm 52B. The top liners C1*a* and C1*b* are wound above and outside the first support roll 72A and the second support roll 72B. A first pressing roll (hold member) 141*a* and a second pressing roll (hold member) 141*b* are disposed above the first support roll 72A and the second support roll 72B. However, the first pressing roll 141*a* and the second pressing roll 141*b* are not limited to rolls and are only required to be able to support the top liners C1*a* and C1*b* between them and the first support roll 72A and the second support roll 72B. One end portions of oscillating links 142*a* and 142*b* are rotatably supported on the stand 71, and the first pressing roll 141*a* and the second pressing roll 141*b* are rotatably supported on the distal end portions of the oscillating links 142*a* and 142*b*. Oscillating cylinders 143*a* and 143*b* are rotatably supported on the stand 71, and the distal end portions of drive rods of the oscillating cylinders 143*a* and 143*b* are coupled to the oscillating links 142*a* and 142*b*. When the oscillating cylinders 143*a* and 143*b* are extended, the first pressing roll 141*a* and the second pressing roll 141*b* oscillate via the oscillating links 142*a* and 142*b* and are compression bonded to the first support roll 72A and the second support roll 72B. Thus, the top liners C1*a* and C1*b* can be held between the first support roll 72A and the second support roll 72B and the first pressing roll 141*a* and the second pressing roll 141*b*. This can prevent the top liners C1*a* and C1*b* from falling to the floor surface G under their own weight and from causing wrinkling or folding.

The stand 71 is provided with mounting parts 71*a* and 71*b* hanging downward at positions adjacent to the first support roll 72A and the second support roll 72B. Paper leading edge detection units 102*a* and 102*b* (102) are provided on the mounting parts 71*a* and 71*b*, respectively. Thus, the paper leading edge detection units 102*a* and 102*b* detect the leading edges of the top liners C1*a* and C1*b* between the position at which the base paper rolls Ra and Rb are supported on the first support arm 52A and the second support arm 52B and the position at which the top liners C1*a* and C1*b* are held between the first support roll 72A and the second support roll 72B and the first pressing roll 141*a* and the second pressing roll 141*b*. The paper leading edge detection units 102*a* and 102*b* are preferably provided at positions closer to the first support roll 72A and the second support roll 72B than the middle parts between the base paper rolls Ra and Rb and the first support roll 72A and the second support roll 72B are.

Outer diameter acquisition units 103*a* and 103*b* (103) are provided on the support frame 51. The outer diameter acquisition units 103*a* and 103*b* measure the outer diameters of the base paper rolls Ra and Rb.

The taping device main bodies 109A and 109B have almost the same structure, and thus the following describes the taping device main body 109A, with a description of the taping device main body 109B omitted.

As illustrated in FIG. 5 and FIG. 6, in the taping device main body 109A, a pair of support frames 151 are disposed spaced apart in the Y direction, and a rubber roll 152 is rotatably supported by a rotary shaft 153 between the pair of support frames 151. The distal end portions of the third links 128*a* are rotatably coupled to the respective support frames 151 by the coupling shafts 129*a*. Moving frames 154 are supported on the respective support frames 151 movably along the Z direction. Tape pressing cylinders 155 are fixed to the respective support frames 151, and the distal end portions of drive rods of the tape pressing cylinders 155 are coupled to flange parts 156 of the moving frames 154.

A tape roll Rt in which adhesive tape T is wound is rotatably supported on each moving frame 154 by a support shaft 157, and its movement in the Y direction is restricted by a stopper 158. A pressing plate 159 is rotatably supported on the bottom of each moving frame 154 by a support shaft 160, and a guide member 161 is rotatably supported thereon by a support shaft 162. The pressing plate 159 is biased clockwise in FIG. 6 by a tensile spring 163, and the guide member 161 is biased counterclockwise in FIG. 6 by a tensile spring 164. A knife cylinder 165 is fixed to each support frame 151 adjacent to the guide member 161. A knife 166 is fixed to the distal end portion of a drive rod of the knife cylinder 165. A guide member 167 that is positioned below the knife cylinder 165 and is semi-circular in shape is fixed to each support frame 151. In addition, each support frame 151 is provided with remaining tape sensors 168, and each moving frame 154 is provided with a tape rotation detection sensor 169.

Thus, by activating the elevating cylinder 126*a* and the oscillating cylinder 131*a*, the taping device main body 109A moves to a lowered position. In this process, in the taping device main body 109A, the rubber roll 152 and the guide member 167 make contact with the outer peripheral face of the base paper roll Ra. In this process, the base paper roll Ra rotates counterclockwise in FIG. 6, winding the top liner C1*a*. At a certain time, that is, before the leading edge of the top liner C1*a* reaches the guide member 161, the tape pressing cylinder 155 extends to lower the moving frame 154. Then, the guide member 161 provided on the moving frame 154, while rotating, presses the leading edge of the adhesive tape T against the outer peripheral face of the base paper roll Ra. When the base paper roll Ra rotates in this state, the adhesive tape T is affixed to the outer peripheral face of the base paper roll Ra. When the adhesive tape T is affixed to the outer peripheral face of the base paper roll Ra, the tape pressing cylinder 155 is retracted to raise the moving frame 154. At a certain time, that is, when the leading edge of the top liner C1*a* has passed the guide member 161, the knife cylinder 165 is extended to thrust the knife 166, cutting the adhesive tape T.

<Conveyance Path for Corrugated Cardboard Base Paper>

Figure 7:
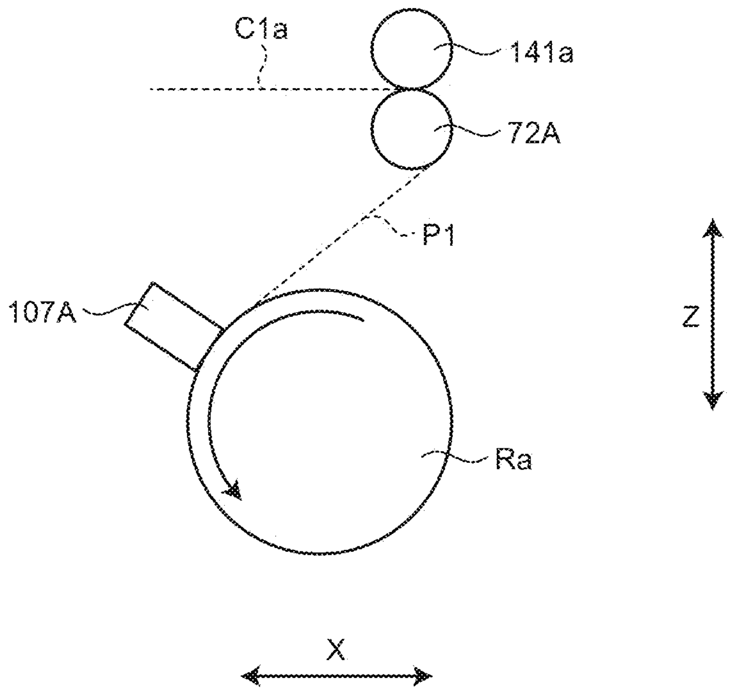
FIG. 7 is a schematic diagram of an inner winding path in the device for processing a base paper roll.
Figure 8:
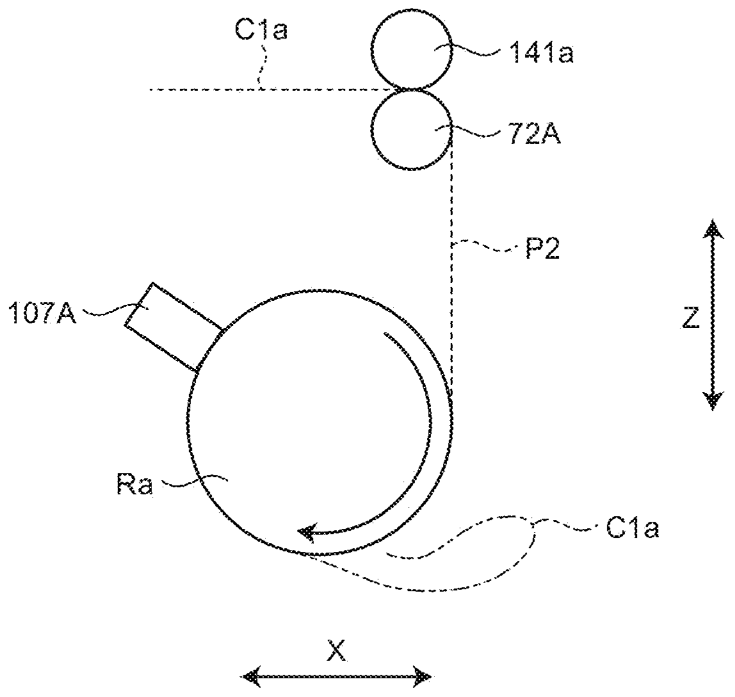
FIG. 8 is a schematic diagram of an outer winding path in the device for processing a base paper roll.

FIG. 7 is a schematic diagram of an inner winding path in the device for processing a base paper roll, and FIG. 8 is a schematic diagram of an outer winding path in the device for processing a base paper roll.

By the way, as illustrated in FIG. 2, in the splicer 33, the base paper rolls Ra and Rb are supported on the first support arm 52A and the second support arm 52B, in which, for example, the rotation direction differs in accordance with the type of the corrugated cardboard base paper (the bottom liner A, the mediums B1 and B2, and the top liners C1 and C2). For example, the top liner C1*a*, which is represented by the solid line in FIG. 2, is supplied toward the first support roll 72A by the base paper roll Ra rotating clockwise and is wound to the base paper roll Ra by the base paper roll Ra rotating counterclockwise. On the other hand, the top liner C1*a*, which is represented by the two dotted line in FIG. 2, is supplied toward the first support roll 72A by the base paper roll Ra rotating counterclockwise and is wound to the base paper roll Ra by the base paper roll Ra rotating clockwise.

That is, as illustrated in FIG. 2 and FIG. 7, the mill roll stand 12 has the support arms 52A and 52B and the support rolls 72A and 72B. For example, the first support roll 72A and the first pressing roll 141*a* are disposed above the support position of the base paper roll Ra by the first support arm 52A in the Z direction and on one side in the horizontal direction (on the right in FIG. 7). The taping device 107A is disposed on the other side in the horizontal direction (on the left) with respect to the support position of the base paper roll Ra. Then, a first path P1 is set in which the top liner C1*a* starting from the first support roll 72A passes by the taping device 107A and is wound to the base paper roll Ra. That is, when the base paper roll Ra rotates counterclockwise in FIG. 7, the top liner C1*a* drawn out of the used base paper roll Ra passes through the first path P1 to be wound. The processing in which the top liner C1*a* passes through the first path P1 to be wound to the base paper roll Ra is referred to as inner winding processing. In this case, the leading edge of the top liner C1*a*, that is, the leading edge of the corrugated cardboard base paper reaches the taping device 107A from above in the Z direction on the outer peripheral face of the base paper roll Ra.

On the other hand, as illustrated in FIG. 2 and FIG. 8, a second path P2 is set in which the top liner C1*a* starting from the support roll 72A passes through the side opposite from the taping device 107A and is wound to the base paper roll Ra. That is, when the base paper roll Ra rotates clockwise in FIG. 8, the top liner C1*a* drawn out of the used base paper roll Ra passes through the second path P2 to be wound. The processing in which the top liner C1*a* passes through the second path P2 to be wound to the base paper roll Ra is referred to as outer winding processing. In this case, the leading edge of the top liner C1*a*, that is, the leading edge of the corrugated cardboard base paper reaches the taping device 107A from below in the Z direction on the outer peripheral face of the base paper roll Ra.

Then, as illustrated in FIG. 7, in the inner winding processing, in which the top liner C1*a* passes through the first path P1 to be wound to the base paper roll Ra, when the top liner C1*a* is wound to the base paper roll Ra at high speed, the leading edge of the top liner C1*a* flutters and becomes folded inward. Thus, in the present embodiment, during the inner winding processing, the control unit 112 reduces the rotation speed of the base paper roll Ra when the paper leading edge detection unit 102 detects the leading edge of the top liner C1*a*. In other words, when the leading edge of the corrugated cardboard base paper reaches the taping device 107A from above in the Z direction on the outer peripheral face of the base paper roll Ra, the rotation speed of the base paper roll Ra is reduced.

On the other hand, as illustrated in FIG. 8, in the outer winding processing, in which the top liner C1*a* passes through the second path P2 to be wound to the base paper roll Ra, when the top liner C1*a* is wound to the base paper roll Ra at low speed, the leading edge of the top liner C1*a* falls to the ground and becomes folded inward. Thus, in the present embodiment, during the outer winding processing, the control unit 112 raises the rotation speed of the base paper roll Ra when the paper leading edge detection unit 102 detects the leading edge of the top liner C1*a*. In other words, when the leading edge of the corrugated cardboard base paper reaches the taping device 107A from below in the Z direction on the outer peripheral face of the base paper roll Ra, the rotation speed of the base paper roll Ra is raised.

While the above describes the path of the top liner C1*a* supported by the first support arm 52A and the first support roll 72A in the mill roll stand 12, the path of the top liner C1*b* supported by the second support arm 52B and the second support roll 72B in the mill roll stand 12 is line symmetrical and has the same configuration and action.

<Method for Processing Base Paper Roll>

Figure 9:
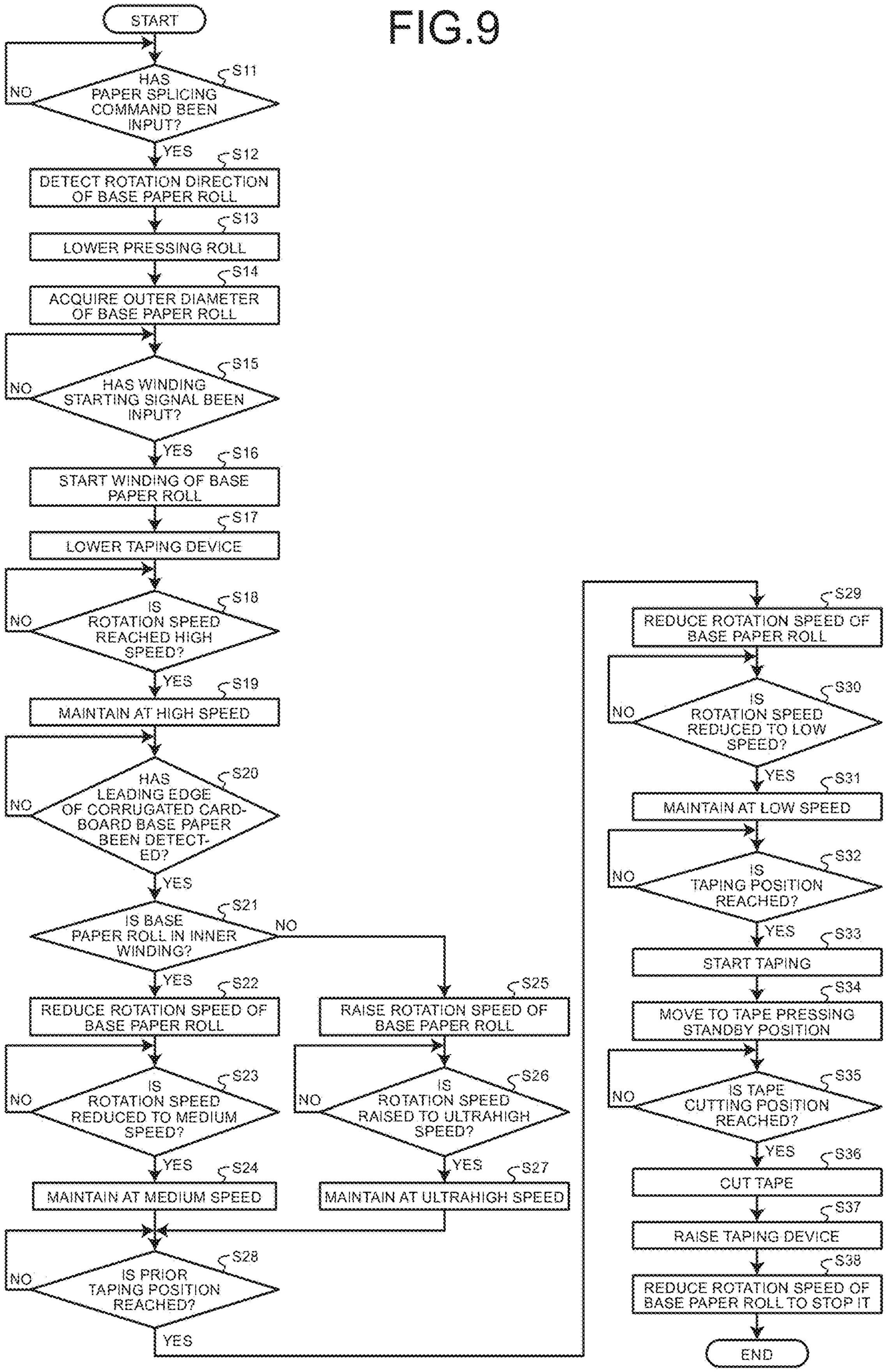
FIG. 9 is a flowchart of a procedure of taping processing in the device for processing a base paper roll.
Figure 10:
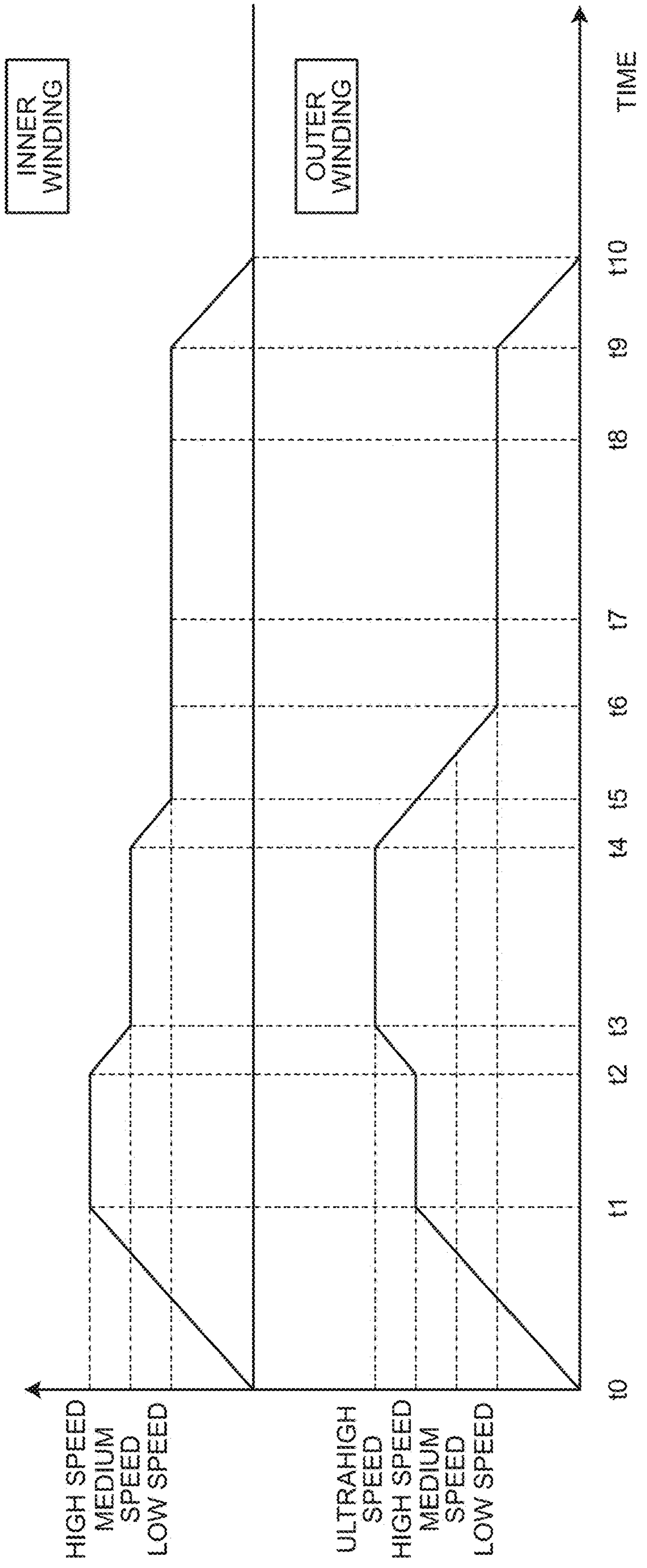
FIG. 10 is a time chart of the procedure of the taping processing in the device for processing a base paper roll.

FIG. 9 is a flowchart of a procedure of taping processing in the device for processing a base paper roll, and FIG. 10 is a time chart of the procedure of the taping processing in the device for processing a base paper roll.

The method for processing a base paper roll of the present embodiment has a step of winding corrugated cardboard base paper drawn out by rotating the base paper rolls Ra and Rb, a step of detecting the leading edge of the wound corrugated cardboard base paper, a step of calculating the activation starting time of the taping device 107 based on a detection position of the leading edge of the corrugated cardboard base paper, and a step of activating the taping device 107 at the activation starting time to fix the leading edge of the wound corrugated cardboard base paper to the outer peripheral faces of the base paper rolls Ra and Rb with the adhesive tape T. The following description describes only the processing on the base paper roll Ra.

As illustrated in FIG. 3 and FIG. 9, at Step S11, the control device 105 determines whether a paper splicing command signal has been input from the input unit 101. If determining that the paper splicing command signal has not been input (No), the control device 105 waits in this state. On the other hand, if determining that the paper splicing command signal has been input (Yes), the control device 105 detects the rotation direction of the base paper roll Ra for winding the top liner C1*a* at Step S12. That is, the control device 105 detects whether the top liner C1*a* is in the first path P1 (the inner winding) or in the second path P2 (the outer winding). Detection of the rotation direction of the base paper roll Ra is performed based on, for example, the detection result of the encoder of the servo motor forming the drive device 66*a*. The processing at Step S12 is not limited to the above timing and may be any timing so long as it is before the processing at Step S16.

At Step S13, the first pressing roll 141*a* is lowered by the oscillating cylinder 143*a* via the oscillating link 142*a*, and the top liner C1*a* is held between the first pressing roll 141*a* and the first support roll 72A. At Step S14, the control device 105 acquires the outer diameter of the base paper roll Ra based on the detection result of the outer diameter acquisition unit 103. At Step S15, the control device 105 determines whether a winding starting signal has been input. The winding starting signal is a paper splicing completion signal output by the splicer 33. The paper splicing completion signal is, for example, a signal output when the first knife 75A is activated to cut the top liner C1*a* in the splicer 33. If determining that the winding starting signal has not been input (No), the control device 105 waits in this state. On the other hand, if determining that the winding starting signal has been input (Yes), at Step S16, the control device 105 starts rotation of the base paper roll Ra by the drive device 66*a* and accelerates it to start winding of the drawn-out liner C1*a*. At Step S17, the taping device main body 109A is lowered by the main body support device 108A of the taping device 107A to bring the rubber roll 152 into contact with the outer peripheral face of the base paper roll Ra. The processing at Step S14 is not limited to the above timing and may be any timing so long as it is between the processing at Step S12 and the processing at Step S15.

At step S18, the control device 105 determines whether the rotation speed of the base paper roll Ra has reached a high speed set in advance. The control device 105 acquires the rotation speed of the base paper roll Ra based on the detection result of the encoder of the servo motor forming the drive device 66*a*. If determining that the rotation speed of the base paper roll Ra has not reached the high speed (No), the control device 105 maintains this state. If determining that the rotation speed of the base paper roll Ra has reached the high speed (Yes), the control device 105 maintains the rotation speed of the base paper roll Ra at the high speed at Step S19. At Step S20, the control device 105 determines whether the leading edge of the top liner C1*a* in the base paper roll Ra has been detected based on the detection result of the paper leading edge detection unit 102. If determining that the leading edge of the top liner C1*a* in the base paper roll Ra has not been detected (No), the control device 105 waits in this state. On the other hand, if determining that the leading edge of the top liner C1*a* in the base paper roll Ra has been detected (Yes), the control device 105 moves to Step S21.

At Step S21, the control device 105 checks whether the base paper roll Ra is in the inner winding based on the processing result at Step S12. If determining that the base paper roll Ra is in the inner winding (Yes), the control device 105 reduces the rotation speed of the base paper roll Ra at Step S22. Then, at Step S23, the control device 105 determines whether the rotation speed of the base paper roll Ra has been reduced to a medium speed set in advance. If determining that the rotation speed of the base paper roll Ra has not been reduced to the medium speed (No), the control device 105 maintains this state. If determining that the rotation speed of the base paper roll Ra has been reduced to the medium speed (Yes), the control device 105 maintains the rotation speed of the base paper roll Ra at the medium speed at Step S24.

On the other hand, at Step S21, if determining that the base paper roll Ra is not in the inner winding but in the outer winding (No), the control device 105 raises the rotation speed of the base paper roll Ra at Step S25. Then, at Step S26, the control device 105 determines whether the rotation speed of the base paper roll Ra has been raised to an ultrahigh speed set in advance. If determining that the rotation speed of the base paper roll Ra has not been raised to the ultrahigh speed (No), the control device 105 maintains this state. If determining that the rotation speed of the base paper roll Ra has been raised to the ultrahigh speed (Yes), the control device 105 maintains the rotation speed of the base paper roll Ra at the ultrahigh speed at Step S27.

At Step S28, the control device 105 determines whether the leading edge of the top liner C1*a* in the base paper roll Ra has reached a prior taping position (the speed reduction starting time). The adhesive tape T for fixing the leading edge of the top liner C1*a* to the outer peripheral face of the base paper roll Ra has a certain length from the upstream side to the downstream side in the rotation direction in the base paper roll Ra with respect to the leading edge of the base paper roll Ra. The activation starting time of the taping device 107 is a time when the upstream leading edge of the adhesive tape T is affixed to the outer peripheral face of the base paper roll Ra. An activation ending time of the taping device 107 is a time when the downstream end of the adhesive tape T is cut, affixed to the outer peripheral face of the base paper roll Ra, and cut. The speed reduction starting time is a time that is a certain time (certain distance) before the activation starting time. The activation starting time, the activation ending time, and the speed reduction starting time are calculated based on the time when the paper leading edge detection unit 102 detects the leading edge of the top liner C1*a*, the outer diameter of the base paper roll Ra measured by the outer diameter acquisition unit 103, and the rotation amount of the base paper roll Ra detected by the rotation amount acquisition unit 104.

At Step S28, if determining that the leading edge of the top liner C1*a* in the base paper roll Ra has not reached the prior taping position (the speed reduction starting time) (No), the control device 105 maintains this state. On the other hand, if determining that the leading edge of the top liner C1*a* in the base paper roll Ra has reached the prior taping position (the speed reduction starting time) (Yes), the control device 105 reduces the rotation speed of the base paper roll Ra at Step S29. Then, at Step S30, the control device 105 determines whether the rotation speed of the base paper roll Ra has been reduced to a low speed set in advance. If determining that the rotation speed of the base paper roll Ra has not been reduced to the lower speed (No), the control device 105 maintains this state. If determining that the rotation speed of the base paper roll Ra has been reduced to the low speed (Yes), the control device 105 maintains the rotation speed of the base paper roll Ra at the low speed at Step S31.

At step S32, the control device 105 determines whether the leading edge of the top liner C1*a* in the base paper roll Ra has reached a taping position (the activation starting time). If determining that the leading edge of the top liner C1*a* in the base paper roll Ra has not reached the taping position (the activation starting time) (No), the control device 105 maintains this state. On the other hand, if determining that the leading edge of the top liner C1*a* in the base paper roll Ra has reached the taping position (the activation starting time) (Yes), the control device 105 activates the taping device 107A at Step S33. In other words, the tape pressing cylinder 155 is extended to lower the guide member 161, pressing the leading edge of the adhesive tape T against the outer peripheral face of the base paper roll Ra.

When a certain time has elapsed, and the base paper roll Ra rotates, the adhesive tape T is affixed to the outer peripheral face of the base paper roll Ra by a certain length, and thus at Step S34, the tape pressing cylinder 155 is retracted to raise the guide member 161, which moves to its standby position.

At Step S35, the control device 105 determines whether the leading edge of the top liner C1*a* in the base paper roll Ra has reached a tape cutting position (the activation ending time). If determining that the leading edge of the top liner C1*a* in the base paper roll Ra has not reached the tape cutting position (the activation ending time) (No), the control device 105 maintains this state. On the other hand, if determining that the leading edge of the top liner C1*a* in the base paper roll Ra has reached the tape cutting position (the activation ending time) (Yes), the control device 105 extends the knife cylinder 165 to thrust the knife 166, cutting the adhesive tape T at Step S36. Then, at Step S37, the taping device main body 109A is raised by the main body support device 108A of the taping device 107A to separate the rubber roll 152 from the outer peripheral face of the base paper roll Ra. At Step S38, the rotation speed of the base paper roll Ra is reduced to stop it.

The following describes control of the rotation speed of the base paper roll in the processing of the base paper roll described above based on the time chart in FIG. 10.

As illustrated in FIG. 10, at time to, the base paper roll Ra starts rotating and accelerates to start winding of the top liner C1*a*. At time t1, the rotation speed of the base paper roll Ra reaches the high speed and is maintained at it. At time t2, at which the leading edge of the top liner C1*a* in the base paper roll Ra is detected, when the base paper roll Ra is in the inner winding, the rotation speed of the base paper roll Ra is reduced. Then, at time t3, the rotation speed of the base paper roll Ra is maintained at the medium speed. In this process, the high speed at time t1 may be set to the medium speed. On the other hand, at time t2, at which the leading edge of the top liner C1*a* in the base paper roll Ra is detected, when the base paper roll Ra is in the outer winding, the rotation speed of the base paper roll Ra is raised. Then, at time t3, the rotation speed of the base paper roll Ra is maintained at the ultrahigh speed. In this process, the high speed may be set to the ultrahigh speed at time t2 in order to, for example, shorten the time cycle.

At time t4, when the leading edge of the top liner C1*a* in the base paper roll Ra reaches the prior taping position (the speed reduction starting time), the rotation speed of the base paper roll Ra is reduced. When the base paper roll Ra is in the inner winding, the rotation speed of the base paper roll Ra is maintained at the low speed at time t5. On the other hand, when the base paper roll Ra is in the outer winding, the rotation speed of the base paper roll Ra is maintained at the low speed at time t6.

At time t7, the leading edge of the top liner C1*a* in the base paper roll Ra reaches the taping position (the activation starting time), and the taping device 107A is activated to press the leading edge of the adhesive tape T against the outer peripheral face of the base paper roll Ra. In this process, the rotation speed of the base paper roll Ra may be raised after the adhesive tape T is affixed by a certain amount in order to, for example, shorten the time cycle. At time t8, when the leading edge of the top liner C1*a* in the base paper roll Ra reaches the tape cutting position (the activation ending time), the knife 166 cuts the adhesive tape T. Then, at time t9, the rotation speed of the base paper roll Ra is reduced, and at time t10, the rotation of the base paper roll Ra stops.

Effects of Present Embodiment

A device for processing a base paper roll according to a first aspect includes the winding device 106 winding the corrugated cardboard base paper drawn out by rotating the base paper rolls Ra and Rb, the paper leading edge detection unit 102 detecting the leading edge of the corrugated cardboard base paper (the bottom liner A, the mediums B1 and B2, and the top liners C1 and C2) wound by the winding device 106, the taping device 107 fixing the leading edge of the wound corrugated cardboard base paper to the outer peripheral faces of the base paper rolls Ra and Rb with the adhesive tape T, and the control unit controlling the rotation speeds of the base paper rolls Ra and Rb based on an arrival direction of the leading edge of the corrugated cardboard base paper with respect to the taping device 107 on the outer peripheral faces of the base paper rolls Ra and Rb when the paper leading edge detection unit 102 detects the leading edge of the corrugated cardboard base paper and activating the taping device 107 after controlling the rotation speeds of the base paper rolls Ra and Rb.

According to the device for processing a base paper roll according to the first aspect, the control unit 112 controls the rotation speeds of the base paper rolls Ra and Rb based on the arrival direction of the leading edge of the corrugated cardboard base paper with respect to the taping device 107 on the outer peripheral faces of the base paper rolls Ra and Rb. In this case, the leading edge of the corrugated cardboard base paper is prevented from becoming folded inward, and the corrugated base paper can be properly wound to the base paper rolls Ra and Rb. Consequently, the corrugated cardboard base paper that has been drawn out of the base paper rolls Ra and Rb is properly wound, and the adhesive tape T is affixed to a proper position, and thereby the leading edge of the corrugated cardboard base paper can be precisely fixed to the outer peripheral faces of the base paper rolls Ra and Rb.

A device for processing a base paper roll according to a second aspect is the device for processing a base paper roll according to the first aspect, further including the outer diameter acquisition unit 103 acquiring the outer diameter information of the base paper rolls Ra and Rb, the rotation amount acquisition unit 104 acquiring the rotation amounts of the base paper rolls Ra and Rb, and the computation unit 111 calculating the activation starting time of the taping device 107 based on the detection result of the paper leading edge detection unit 102, the acquisition result of the outer diameter acquisition unit 103, and the acquisition result of the rotation amount acquisition unit 104, in which the control unit 112 activates the taping device 107 at the activation starting time. With this configuration, the activation starting time is calculated based on the detection time of the paper leading edge detection unit 102 directly detected by the paper leading edge detection unit 102, and thus the taping device 107 can be activated at a proper time.

A device for processing a base paper roll according to a third aspect is the device for processing a base paper roll according to the second aspect, in which further the computation unit 111 calculates the speed reduction starting time, at which the rotation speeds of the base paper rolls Ra and Rb are reduced, before the activation starting time, and the control unit 112 reduces the rotation of the base paper rolls Ra and Rb at the speed reduction starting time. With this configuration, the speed reduction starting time is calculated based on the detection time of the paper leading edge detection unit 102 directly detected by the paper leading edge detection unit 102, and thus by reducing the rotation of the base paper rolls Ra and Rb at a proper time, the adhesive tape T can be properly affixed by the taping device 107.

A device for processing a base paper roll according to a fourth aspect is the device for processing a base paper roll according to any one of the first aspect to the third aspect, in which further the winding device 106 has the support rolls (the support members) 72A and 72B supporting the corrugated cardboard base paper wound thereon on one side in the horizontal direction above the support positions of the base paper rolls Ra and Rb in the vertical direction and the pressing rolls (the hold members) 141*a* and 141*b* holding the corrugated cardboard base paper between the pressing rolls 141*a* and 141*b* and the support rolls 72A and 72B, and the paper leading edge detection units 102*a* and 102*b* detect the leading edge of the corrugated cardboard base paper between the support positions of the base paper rolls Ra and Rb and the support rolls 72A and 72B. With this configuration, even if the corrugated cardboard base paper has slack between the base paper rolls Ra and Rb and the holding positions between the support rolls 72A and 72B and the pressing rolls 141*a* and 141*b*, the corrugated cardboard base paper is supported with the slack eliminated upon start of winding. Thus, the paper leading edge detection unit 102 detects the leading edge of the corrugated cardboard base paper immediately after the held state between the support rolls 72A and 72B and the pressing rolls 141*a* and 141*b* is released. Thus, the paper leading edge detection unit 102 can surely detect the leading edge of the corrugated cardboard base paper.

A device for processing a base paper roll according to a fifth aspect is the device for processing a base paper roll according to any one of the first aspect to the fourth aspect, in which further the first path P1 is set, in which the leading edge of the corrugated cardboard base paper reaches the taping device 107 from above in the vertical direction and is wound to the base paper rolls Ra and Rb on the outer peripheral faces of the base paper rolls Ra and Rb, and the control unit 112 reduces the rotation speeds of the base paper rolls Ra and Rb by the winding device 106 when the paper leading edge detection unit 102 detects the leading edge of the corrugated cardboard base paper. With this configuration, in the inner winding processing, in which the corrugated cardboard base paper passes through the first path P1 to be wound to the base paper rolls Ra and Rb, the corrugated cardboard base paper is wound to the base paper rolls Ra and Rb at the middle speed, the leading edge of the corrugated cardboard base paper is prevented from fluttering and is prevented from becoming folded inward, and the corrugated cardboard base paper can be properly wound to the base paper rolls Ra and Rb.

A device for processing a base paper roll according to a sixth aspect is the device for processing a base paper roll according to any one of the first aspect to the fourth aspect, in which further the second path P2 is set, in which the leading edge of the corrugated cardboard base paper reaches the taping device 107 from below in the vertical direction and is wound to the base paper rolls Ra and Rb on the outer peripheral faces of the base paper rolls Ra and Rb, and the control unit 112 raises the rotation speeds of the base paper rolls Ra and Rb by the winding device 106 when the paper leading edge detection unit 102 detects the leading edge of the corrugated cardboard base paper. With this configuration, in the outer winding processing, in which the corrugated cardboard base paper passes through the second path P2 to be wound to the base paper rolls Ra and Rb, the corrugated cardboard base paper is wound to the base paper rolls Ra and Rb at the ultrahigh speed, the leading edge of the corrugated cardboard base paper is prevented from falling to the ground and is prevented from becoming folded inward, and the corrugated cardboard base paper can be properly wound to the base paper rolls Ra and Rb.

A method for processing a base paper roll according to a seventh aspect includes a step of winding corrugated cardboard base paper drawn out by rotating the base paper rolls Ra and Rb, a step of detecting the leading edge of the wound corrugated cardboard base paper, a step of controlling the rotation speeds of the base paper rolls Ra and Rb based on the arrival direction of the leading edge of the corrugated cardboard base paper with respect to the taping device 107 on the outer peripheral faces of the base paper rolls Ra and Rb, and a step of activating the taping device 107 after controlling the rotation speeds of the base paper rolls Ra and Rb to fix the leading edge of the wound corrugated cardboard base paper to the outer peripheral faces of the base paper rolls Ra and Rb with the adhesive tape T. With this configuration, the leading edge of the corrugated cardboard base paper is prevented from becoming folded inward, and the corrugated base paper can be properly wound to the base paper rolls Ra and Rb. Consequently, the corrugated cardboard base paper that has been drawn out of the base paper rolls Ra and Rb is properly wound, and the adhesive tape T is affixed to a proper position, and thereby the leading edge of the corrugated cardboard base paper can be precisely fixed to the outer peripheral faces of the base paper rolls Ra and Rb.

A device for manufacturing a corrugated cardboard sheet according to an eighth aspect includes the mill roll stands 11, 12, 15, 16, and 19 each rotatably supporting the bottom liner A, the mediums B1 and B2, and the top liners C1 and C2, the single facers 13 and 17 laminating the top liners C1 and C2 on the corrugated mediums B1 and B2 to manufacture the single-faced webs D1 and D2, the double facer 22 laminating the bottom liner A on the mediums B1 and B2 of the single-faced webs D1 and D2 to manufacture the corrugated cardboard sheets E and F, and the device 100 for processing a base paper roll according to any one of the first aspect to the fifth aspect. With this configuration, in the device 100 for processing a base paper roll, the corrugated cardboard base paper that has been drawn out of the base paper rolls Ra and Rb is properly wound, the adhesive tape T is affixed to a proper position, and thereby the leading edge of the corrugated cardboard base paper can be precisely fixed to the outer peripheral faces of the base paper rolls Ra and Rb.

REFERENCE SIGNS LIST

10 CORRUGATING MACHINE (DEVICE FOR MANUFACTURING CORRUGATED CARDBOARD SHEET)
11, 12, 15, 16, 19 MILL ROLL STAND
13, 17 SINGLE FACER
14, 18 BRIDGE
20 PREHEATER
21 GLUE MACHINE
22 DOUBLE FACER
23 ROTARY SHEAR
24 SLITTER SCORER
25 CUTOFF
26 WASTE REMOVING DEVICE
27 STACKER
28, 29 TAKE-UP CONVEYOR
30 PAPER GUIDE DEVICE
31, 32 SPLICER

33, 34 SPLICER
35 SPLICER
41, 42, 43 PREHEATING ROLL
44, 45 GLUING ROLL
51 SUPPORT FRAME
52A FIRST SUPPORT ARM
52B SECOND SUPPORT ARM
71 STAND
72A FIRST SUPPORT ROLL (SUPPORT MEMBER)
72B SECOND SUPPORT ROLL (SUPPORT MEMBER)
73A FIRST INTRODUCTION ROLL
73B SECOND INTRODUCTION ROLL
74A FIRST COMPRESSION BONDING ROLL
74B SECOND COMPRESSION BONDING ROLL
75A FIRST KNIFE
75B SECOND KNIFE
100 DEVICE FOR PROCESSING BASE PAPER ROLL
101 INPUT UNIT
102, 102*a*, 102*b* PAPER LEADING EDGE DETECTION UNIT
103, 103*a*, 103*b* OUTER DIAMETER ACQUISITION UNIT
104 ROTATION AMOUNT ACQUISITION UNIT
105 CONTROL DEVICE
106 WINDING DEVICE
107 TAPING DEVICE
108A, 108B MAIN BODY SUPPORT DEVICE
109A, 109B TAPING DEVICE MAIN BODY
111 COMPUTATION UNIT
112 CONTROL UNIT
123*a*, 123*b* SYNCHRONOUS SHAFT
124*a*, 124*b* SLEEVE
125*a*, 125*b* FIRST LINK
126*a*, 126*b* ELEVATING CYLINDER
128*a*, 128*b* THIRD LINK
130*a*, 130*b* FOURTH LINK
131*a*, 131*b* OSCILLATING CYLINDER
141*a* FIRST PRESSING ROLL (HOLD MEMBER)
141*b* SECOND PRESSING ROLL (HOLD MEMBER)
142*a*, 142*b* OSCILLATING LINK
143*a*, 143*b* OSCILLATING CYLINDER
A BOTTOM LINER (CORRUGATED CARDBOARD BASE PAPER)
B1, B2 MEDIUM (CORRUGATED CARDBOARD BASE PAPER)
C1, C1*a*, C1*b*, C2 TOP LINER (CORRUGATED CARDBOARD BASE PAPER)
D1, D2 SINGLE-FACED WEB
E, F SINGLE-WALL CORRUGATED CARDBOARD SHEET
P1 FIRST PATH
P2 SECOND PATH
Ra, Rb BASE PAPER ROLL
T ADHESIVE TAPE

The invention claimed is:

1. A device for processing a base paper roll, the device comprising:

a winding device that winds corrugated cardboard base paper drawn out by rotating a base paper roll;

a paper leading edge detection unit that detects a leading edge of the corrugated cardboard base paper wound by the winding device;

a taping device that fixes the leading edge of the wound corrugated cardboard base paper to an outer peripheral face of the base paper roll with adhesive tape; and a control unit that controls a rotation speed of the base paper roll based on an arrival direction of the leading edge of the corrugated cardboard base paper with respect to the taping device on the outer peripheral face of the base paper roll when the paper leading edge detection unit detects the leading edge of the corrugated cardboard base paper, and when it is determined that the end of the base paper roll has reached a taping position after controlling the rotation speed of the base paper roll, activates the taping device, and presses the end of the adhesive tape against the outer surface of the base paper roll, wherein a first path is set in which the leading edge of the corrugated cardboard base paper reaches the taping device from above in a vertical direction and is wound to the base paper roll on the outer peripheral face of the base paper roll, and the control unit reduces the rotation speed of the base paper roll by the winding device when the paper leading edge detection unit detects the leading edge of the corrugated cardboard base paper.

2. The device for processing a base paper roll according to claim 1, further comprising:

an outer diameter acquisition unit that acquires outer diameter information of the base paper roll;

a rotation amount acquisition unit that acquires a rotation amount of the base paper roll; and a computation unit that calculates an activation starting time of the taping device based on a detection result of the paper leading edge detection unit, an acquisition result of the outer diameter acquisition unit, and an acquisition result of the rotation amount acquisition unit, wherein the control unit activates the taping device at the activation starting time.

3. The device for processing a base paper roll according to claim 2, wherein the computation unit calculates a speed reduction starting time, at which the rotation speed of the base paper roll is reduced, before the activation starting time, and the control unit reduces rotation of the base paper roll at the speed reduction starting time.

4. The device for processing a base paper roll according to claim 1, wherein the winding device has a support member for supporting the corrugated cardboard base paper on one side in a horizontal direction above a support position of the base paper roll in a vertical direction and a hold member for holding the corrugated cardboard base paper between the hold member and the support member, and the paper leading edge detection unit detects the leading edge of the corrugated cardboard base paper between the support position of the base paper roll and the support member.

5. The device for processing a base paper roll according to claim 1, wherein a second path is set in which the leading edge of the corrugated cardboard base paper reaches the taping device from below in a vertical direction and is wound to the base paper roll on the outer peripheral face of the base paper roll, and the control unit raises the rotation speed of the base paper roll by the winding device when the paper leading edge detection unit detects the leading edge of the corrugated cardboard base paper in the second path.

6. A device for manufacturing a corrugated cardboard sheet, the device comprising:

mill roll stands that each rotatably support a bottom liner, a medium, and a top liner;

a single facer that laminates the top liner on the corrugated medium to manufacture a single-faced web;

a double facer that laminates the bottom liner on the medium of the single-faced web to manufacture a corrugated cardboard sheet; and the device for processing a base paper roll according to claim 1.

* * * * *